Aug. 21, 1951 R. E. ZENNER 2,565,191

EDDY CURRENT SHIELD IN ELECTROMAGNETIC TRANSDUCER HEAD

Filed Jan. 12, 1949

Inventor
Raymond E. Zenner by [signature] Attys

Patented Aug. 21, 1951 2,565,191

UNITED STATES PATENT OFFICE 2,565,191

EDDY CURRENT SHIELD IN ELECTROMAGNETIC TRANSDUCER HEAD

Raymond E. Zenner, Hollywood, Ill., assignor to Armour Research Foundation of Illinois Institute of Technology, Chicago, Ill., a corporation of Illinois Application January 12, 1949, Serial No. 70,469

4 Claims. (Cl. 179—100.2)

This invention relates to electromagnetic transducers, and more particularly, to improvements in electromagnetic transducer heads for magnetic recording machines.

In order to meet space limitations and to reduce cost, manufacturers of magnetic recording devices have constantly striven to reduce the size of the electromagnetic transducer heads in their apparatus without forsaking efficiency of operation. One factor which presents a difficulty to such reduction in size is inefficiency due to the amount of leakage flux which occurs within the magnetic circuit of the transducer head. For instance, the effective operating flux within a conventional type electromagnetic erase head is that which passes through and around the magnetic record member as it passes over or through the magnetic air gap. In general, such an erase head may be made more efficient by decreasing the amount of unusable leakage flux while still retaining the original amount of effective flux, or by decreasing the unusable leakage flux and increasing the amount of effective operating flux for a given magnetomotive force developed in the magnetic circuit.

Another manner of increasing efficiency of such an erase head, and consequently enable reduction in size of the head required for a given erase function, is to properly proportion the magnetic circuit so that a minimum length of the circuit exists for a given size of magnetic circuit structure such, for example, as by using a square circuit instead of a rectangular circuit.

In the present disclosure, however, it is proposed to increase the efficiency of a magnetic erase head by reducing the amount of leakage flux in the magnetic circuit, and at the same time increasing the amount of effective operating flux performing the erase function.

It is a principal object and feature of the present invention to provide a novel, distinctive means for reducing the amount of leakage flux in a magnetic erase head magnetic circuit while at the same time increasing the effective operating flux for a given magnetomotive force in the circuit.

Another object of the present invention is to provide a novel means for reducing the amount of leakage flux developed in the magnetic circuit of an electromagnetic transducer head for magnetic recording devices, and consequently, to increase the efficiency of such head.

It is a further object of the present invention to provide a simple, easy means for increasing the efficiency of electromagnetic transducer heads and thus enable a reduction in size of heads required for given magnetic recording functions.

It is a still further object of the present invention to provide a novel combination magnetic recording, playback and erase head structure in which the magnetic erase head portion is of minimum size.

A still further object of the present invention is to provide a simple means for reducing the air gap flux in an electromagnetic transducer head, thereby to increase the amount of effective operating flux.

Another and still further object of the present invention is to provide a means for reducing the leakage flux in the magnetic circuit of an electromagnetic transducer head, such means also to perform a mechanical function in assembly of the transducer head.

The novel features which I believe to be characteristic of my invention are set forth with particularity in the appended claims. My invention itself, however, both as to its manner of construction and method of operation, together with further objects and advantages thereof, may best be understood by reference to the following description, taken in connection with the accompanying drawing, in which:

Figure 1:
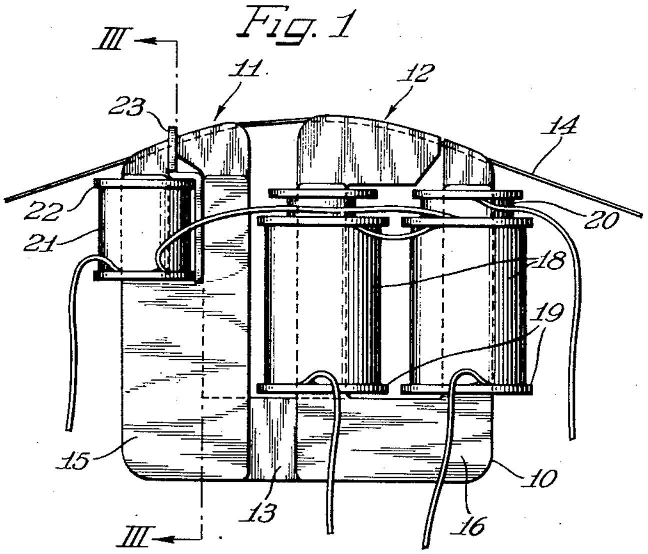
Figure 1 is an elevational view of a transducer assembly embodying the principles of my invention.
Figure 3:
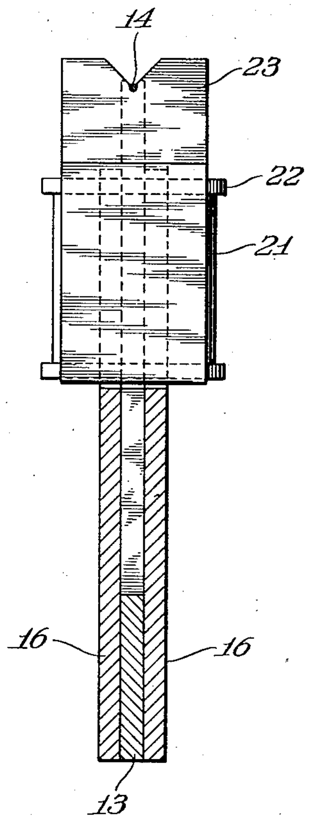
Figure 3 is a cross-sectional view of the transducer assembly as taken on line III—III of Figure 1.
Figure 2:
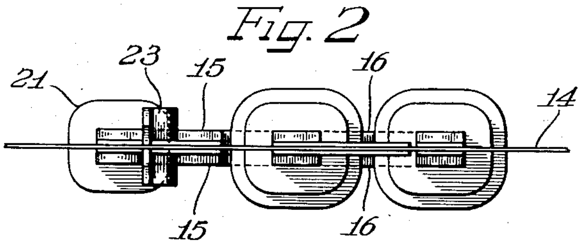
Figure 2 is a top view of the transducer assembly.
Figure 4:
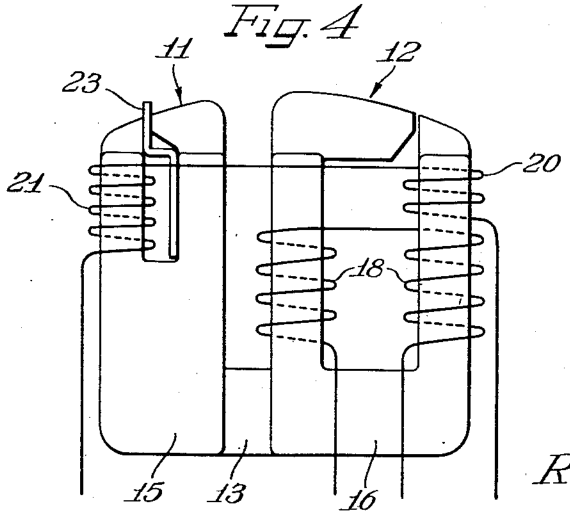
Figure 4 is a diagrammatic lay-out view of the electrical circuit for the transducer assembly.

Referring in greater detail to the drawing:

In Figure 1 of the drawing, I have illustrated an electromagnetic transducer assembly 10 comprising an electromagnetic erase head 11 and a recording-playback head 12 assembled on a common yoke member 13. The heads 11 and 12 are aligned alongside each other to allow passage of a magnetic record member 14 over the air gap in each of their top surfaces. The common yoke member 13 is in effect a double rectangular member with a window in each rectangle and confronting pole tips, one of which is tapered, forming an air gap in an upper corner of each window. The windows are provided so that coils may be wound about one side of the rectangular structure for each head to allow energization of the individual magnetic circuits. U-shaped members 15 and 16 conforming in shape to the lower portions of the magnetic circuits of transducer heads 11 and 12, respectively, are secured to each side of the rectangular structures for the purpose of reducing the magnetic reluctance of the circuits in portions other than the upper portion where the air gap is located. Thus, the magnetic flux developed is concentrated in the upper portion of each circuit.

A pair of audio frequency energizing coils 18 are wound on a corresponding pair of identical spools 19 disposed one on each side of the magnetic circuit for the recording-playback head 12. The coils 18 are wound to effect an additive magnetic relationship and are connected in series to a signal source feeding intelligence material to be recorded. The spools 19 are of a standard type having two coil sections, the smaller section usually being used for high frequency coils. In the present instance, however, only one high frequency coil 20 is wound on the recording-playback head 12. Thus, the head is arranged for magnetic recording with a high frequency bias in accordance with the principles explained in detail in the Marvin Camras United States Letters Patent No. 2,351,004, issued June 13, 1944.

The erase head 11 is also provided with a high frequency coil 21 wound on a spool 22 disposed on one leg of its magnetic circuit. Both high frequency coils 20 and 21 are connected in series for energization by a suitable source of high frequency current such as a high frequency oscillator (not shown).

It is an outstanding feature of the present invention that the erase head 11 is provided with a flux leakage shield member 23 vertically disposed alongside the high frequency coil spool 22 and bending over its upper edge to traverse the width of the rectangular window just below the air gap. An extended portion thereof is thus enabled to reach up between the confronting pole portions of the head 11 to make contact with the record member 14. The shield 23 is substantially as wide as the high frequency coil 21 and is provided with a V-shaped notch having a portion arranged to conform to the contours of the record member 14. The shield is made of suitable low resistance non-magnetic conducting material such as copper or aluminum to facilitate generation of eddy currents therein. Beside acting as a shield, the member 23 is also a spacer for the coil 21 in that it takes up a certain amount of space within the erase head window and during the assembly of the head, it is wedged between the side of the window and the coil spool, thereby to securely hold the high frequency coil 21 in place. The shield also acts as a spacer support for the record member by filling in the air gap and thus aiding in its support as it passes over the erase head.

In normal operation of magnetic erase heads, a number of flux leakage paths usually occur, such as across the window and across the pole tips just below the air gap, all of which serve no purpose since the only effective portion of the flux in the circuit is that which passes across or fringes the top of the air gap. With the copper shield member 23 in position within the window, however, flux lines tending to pass across the magnetic circuit anywhere below the recording wire are substantially halted by the shield member 23, and eddy currents are developed therein in the plane of the shield. The generated eddy currents develop a secondary field opposing the field flux tending to pass through the shield. A substantial portion of the flux which normally would tend to leak across the circuit is, therefore, forced to follow the circuit path, causing the effective inductance of the energizing coil 21 to be decreased. Consequently, the voltage necessary to drive a given current through the erase head is reduced. Since the shield member 23 extends upward between the confronting poles of the head 11, the normal air gap flux for the head is also opposed, thus tending to cause a greater fringing of flux across the gap, and consequently, increasing the amount of flux available to perform erase operations.

While I have shown and described a certain embodiment of my invention, it will, of course, be understood that I do not wish to be limited thereto since many modifications may be made, and I, therefore, contemplate by the appended claims to cover all such modifications as fall within the true spirit and scope of my invention.

I claim as my invention:

1. In combination in an electromagnetic transducer, a magnetic circuit having a path circumscribing an opening, an air gap included in said path, an energizing coil wound on a portion of said magnetic circuit adjacent said gap, a non-magnetic conducting shield member having portions extending from between said air gap to the side of said opening opposite said gap, said shield member having a portion bent therein to traverse the dimension of said opening substantially perpendicular to said extending portion.

2. In combination in an electromagnetic transducer, a magnetic circuit having a path circumscribing a rectangular opening, an air gap included in said path, an energizing coil wound on a side of said magnetic circuit adjacent said gap, a non-magnetic conducting shield member having a width substantially equal to the width of said coil, said shield member extending from between said air gap alongside said energizing coil across one dimension of said opening and having a bent portion therein just below said air gap traversing the dimension perpendicular to said one dimension.

3. In a magnetic transducer head having a magnetic circuit circumscribing a window opening and an air gap included in said circuit, a relatively thin non-magnetic conducting shield having a portion extending from said air gap across said opening in one direction and a bent portion therein traversing said opening in a direction substantially perpendicular to said one direction just below said air gap.

4. In combination in an electromagnetic transducer head, a magnetic core having record contacting surfaces with an air gap therein for travel of a record member thereacross, means defining a window to permit mounting an energizing coil on the core, a non-magnetic electrically conducting shield member having one portion filling said air gap and another portion extending into a substantial portion of said window to interrupt leakage flux across said window.

RAYMOND E. ZENNER.

REFERENCES CITED

The following references are of record in the file of this patent:

UNITED STATES PATENTS

| Number | Name | Date |
|---|---|---|
| 823,086 | Thullen | June 12, 1906 |
| 1,519,098 | Adert | Dec. 16, 1924 |
| 2,040,103 | Prince | May 12, 1936 |
| 2,114,189 | Kronmiller | Apr. 12, 1938 |
| 2,277,305 | Clopton | Mar. 24, 1942 |
| 2,431,540 | Camras | Nov. 25, 1947 |
| 2,456,767 | Camras | Dec. 21, 1948 |
| 2,459,299 | West | Jan. 18, 1949 |

FOREIGN PATENTS

| Number | Country | Date |
|---|---|---|
| 669,415 | France | Feb. 14, 1931 |